United States Patent [19]
Giesselmann et al.

[11] 3,789,114
[45] Jan. 29, 1974

[54] PROCESS FOR THE PRODUCTION OF HYDROGEN PEROXIDE BY THE ANTHRAQUINONE PROCESS

[75] Inventors: Günter Giesselmann, Heusenstamm; Gerd Schreyer, Grossauheim; Wolfgang Weigert, Offenbach, all of Germany

[73] Assignee: Deutsche Gold- und Silber-Scheidean-Stalt vormals Roessler, Frankfurt (Main), Germany

[22] Filed: Jan. 27, 1972

[21] Appl. No.: 221,444

[30] Foreign Application Priority Data
Jan. 30, 1971 Germany............................ 2104432

[52] U.S. Cl.............. 423/588, 252/404, 260/248 R, 260/369
[51] Int. Cl........................ C01b 15/02, B01j 1/16
[58] Field of Search ........... 423/588, 589, 590, 591; 260/248 R; 252/397, 399, 404

[56] References Cited
UNITED STATES PATENTS

| | | | |
|---|---|---|---|
| 3,002,817 | 10/1961 | Villemey............................ | 423/588 |
| 3,004,831 | 10/1961 | Hungerford et al. ............... | 423/588 |
| 3,206,407 | 9/1965 | Lutwack .......................... | 260/248 R |
| 3,394,993 | 7/1968 | Grifo.................................. | 252/399 |

FOREIGN PATENTS OR APPLICATIONS

| | | | |
|---|---|---|---|
| 1,150,748 | 1/1958 | France............................... | 260/248 |
| 846,765 | 8/1960 | Great Britain..................... | 260/248 |

*Primary Examiner*—Edward J. Meros
*Assistant Examiner*—Hoke S. Miller
*Attorney, Agent, or Firm*—Cushman, Darby & Cushman

[57] ABSTRACT

Hydrogen peroxide is produced by the anthraquinone process employing a stabile 1, 3, 5-triazine as the solvent for the reaction carrier.

22 Claims, No Drawings

PROCESS FOR THE PRODUCTION OF HYDROGEN PEROXIDE BY THE ANTHRAQUINONE PROCESS

In the anthraquinone process for producing hydrogen peroxide, special demands are placed on the solvent for the reaction carrier, i.e., the quinone derivative. Thus, it should not only have a high dissolving power for the quinone or the hydroquinone form of the reaction carrier, but it must also comply with requirements of density, viscosity, and interfacial tension occurring in the individual steps of the anthraquinone process. Furthermore, it influences the speed of hydrogenation and oxidation and the flow of the working solution through the apparatus. Furthermore, it should have a low solubility in water, but high flash and burning points. Besides, the solvent should remain practically unchanged throughout the cyclic process.

These requirements can only be met industrially by mixing both a solvent for the anthraquinone and a solvent for the anthrahydroquinone. Working solutions which consist of a single solvent have, until now, not been successful industrially. See Winnacker-Küchler, Chem. Technologie, Vol. I, Anorg. Technologie I, (1970) pages 534–535.

The present invention is directed to a process for the production of hydrogen peroxide according to the known anthraquinone process which is modified by employing as solvents for the reaction carrier stable, liquid triazines as the sole solvent or in admixture with known quinone or hydroquinone solvents.

There can be used 1,3,5-triazines of general formula I

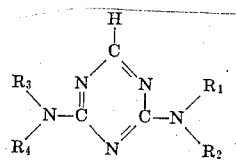

wherein $R_1$ is an alkyl group of one to four carbon atoms, preferably one to two carbon atoms, $R_2$, $R_3$ and $R_4$ defined as for $R_1$ and can be the same as or different from $R_1$.

As sole solvents for the reaction carrier 2-dimethylamino-4-diethylamino-6-H-triazine and 2,4-bis(diethylamino)-6-H-triazine are preferred. There can also be used other liquid triazines, such as 2-(N-methyl-N-n-butyl)-amino-4-di-n-propylamino-6-H-triazine, 2,4-bis(N-methyl-N-ethyl)-amino-6-H-triazine, 2-diethylamino-4-di-isopropylamino-6-H-triazine, 2-(N-methyl-N-ethyl)-amino-4-diethylamino-6-H-triazin, 2-(N-methyl-N-sec. butyl)-amino-4-diethylamino-6-H-triazine.

Since the densities of these triazine compounds, however, are not sufficiently different from water, an extraction of the hydrogen peroxide formed in the process with water is only possible if the triazine compounds of formula I are used in admixture with other quinone or hydroquinone solvents which make possible a corresponding adjustment in density.

As quinone solvents there can be used, for example, aromatic hydrocarbons such as polyalkylbenzenes, e.g., mixtures of aromatic hydrocarbons boiling at 158° – 186° C, or 185° – 205° C, or 205° – 220° C, t-butyltoluene, trimethylbenzene, t-butylbenzene, 1,3-diethylbenzene, xylene, p-cymene, 1,4diethylbenzene, isodurene, 1,2,3,4-tetramethylbenzene; as hydroquinone solvents there can be used, for example, phosphoric acid esters (I) and phosphonic acid esters (II) of general formula

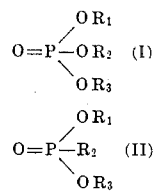

wherein $R_1$, $R_2$ and $R_3$ are alkyl groups, prefered are esters with aliphatic residuals having a total number of carbon atoms in the chains ($R_1 + R_2 + R_3$) between 12 + 36, e.g., tri-n-butylphosphat tris (2-ethylhexyl) phosphat, trioctyl phosphate, triamyl phosphate, trisdecyl phosphate, trisisodecyl phosphat, trisdodecyl phosphate, trisisododecyl phosphate, diamylethane phosphate, higher alcohols such as diisobutyl carbinol, octanol-2, isodecyl alcohols, higher ketones, e.g., diisobutyl ketone, dibutyl ketone, diamyl ketone, carboxylic acid esters such as methyl cyclohexyl acetate. The proportions of the triazine to the known solvents must be so chosen that the resulting density of the total mixture at 20° C is less than 0.98. Then the hydrogen peroxide can be extracted well, with water, from the mixture. The triazine should be at least 15 percent of the total solvent by volume.

The above-named triazine compounds can only be used as the sole solvents when the hydrogen peroxide formed is desorbed with other organic solvents.

The desorption of hydrogen peroxide can be suitably carried out with carboxylic acids and their esters, as well as alcohols, ethers and ketones in a given case in admixture with Schreyer et al application Ser. No. 856,070 filed Sept. 8, 1969 and Schreyer et al application Ser. No. 79,315 filed Oct. 8, 1970 (and corresponding German applications P1802003.6 and P1951211.9). The entire disclosures of the Schreyer et al United States applications Ser. Nos. 856,070 and 79,315 are hereby incorporated by reference.

Since a working solution from which hydrogen peroxide is recovered by desorption processes is subjected to higher loads than an equal solution in which the hydrogen peroxide is extracted by water, it has frequently proven advantageous in the first case, to stabilize. Conventional antioxidants are suitable for this purpose, e.g., phenolic antioxidants, especially sterically hindered phenols and naphthols such as, for example, 2,6-di-t-butylphenol, 2,6-di-t-butyl-4-methyl phenol, 2,2'-methylene bis(4-ethyl-6-t-butyl phenol), 4,4'-butylidene bis(6-t-butyl-m-cresol), bis(2-hydroxy-3-t-butyl-5-methyl phenyl methyl) durene, 2,2'-methylene bis (p-cresol), 2,4,6-tri-t-amylphenol, 2,6-dicyclohexyl cresol and 4,4'-methylene bis(2,6-di-t-amyl phenol). These materials are completely effective when they are added in amounts of 0.1 to 1 weight percent based on the amount of working solution. A higher amount of the antioxidant is not disadvantageous. The speed of oxidation of the anthrahydroquinones in the cyclic process is not influenced by the addition of these antioxidants; the stability of the hydrogen peroxide produced is even increased. It should be understood that these antioxidants can also be added if the hydrogen peroxide is not desorbed but is extracted with water.

As quinone derivatives there can be used, as is customary in the art, alkyl anthraquinones which contain alkyl chains of 2 or more carbon atoms. Especially suitable are 2-ethyl anthraquinone, 2-t-butyl anthraquinone and 2-amyl anthraquinone. Other suitable anthraquinones include 2-butyl anthraquinone, 2-isopropyl anthraquinone, 2-sec.amyl-anthraquinone, anthraquinone, 2,7-diethyl anthraquinone and their partially nuclear hydrogenated derivatives, e.g., the tetrahydro anthraquinones such as 2-ethyl tetrahydro anthraquinone.

Unless otherwise indicated all parts and percentages are by weight.

In the following Table A, as an example, there is given 2-dimethylamino-4-diethylamino-6-H-triazine. At the indicated temperatures it dissolved the indicated amounts of a 50/50 mixture of 2-ethyl anthraquinone and 2-ethyl tetrahydro anthraquinone:

TABLE A

| Temperature | Amount of Mixture Dissolved |
|---|---|
| 25° C | 240 grams/liter |
| 45° C | 300 grams/liter |
| 60° C | 400 grams/liter |
| 70° C | 500 grams/liter |

The solubility of a 50/50 mixture of 2-ethyl anthrahydroquinone and 2-ethyl tetrahydroanthrahydroquinone is 450 grams/liter at 70° C.

The basicity of the triazines is comparable with that of collidine. In the literature for collidine there is a $pK_B$ value of 6.69; the $pK_B$ of the triazine compound used in Table A has been determined to be 6.78. In accordance with this basicity the triazine compound is also very easily soluble in dilute acid. In neutral water on the contrary, it dissolves only to an extent of less than 0.1 percent. In reverse, water is soluble in the triazine to an extent of 15 percent at 20° C. and on the contrary only to an extent of 4 percent at 60° C.

Furthermore, the solubility of water in the triazine compound is dependent on the anthraquinone content. In a solution of 300 grams of anthraquinone per liter, only about 2 percent of water is soluble at 60° C.

The significant data for the triazine used in carrying out the invention are given, for example, in Table 1.

TABLE 1

PHYSICAL PROPERTIES OF
2-dimethyl-amino-4-diethylamino-6-H-1,3,5-triazine

| | |
|---|---|
| Boiling Point (760 Torr) | 253° C. |
| Melting Point | −70° C. |
| Flash Point | 143° C. |
| Burning Point | 155.5° C. |
| $n_D^{25}$ | 1.5265 |
| Density (20° C.) | 1.0367 |
| Density (40° C.) | 1.0204 |
| Density (60° C.) | 1.0045 |
| Viscosity (20° C.) | 10.6 cps. |
| Viscosity (40° C.) | 4.96 cps. |
| Viscosity (60° C.) | 3.00 cps. |
| $pK_B$ value | 6.78 |

The invention will be further illustrated in the following examples. The approximately 5 percent higher $H_2O_2$ yield in Example 3 in comparison with Example 1 points to the fact that the hydrogen peroxide formed can be stabilized by the antioxidizing agent.

EXAMPLE 1

300 grams of a mixture of 50 parts of 2-ethyl anthraquinone and 50 parts of 2-ethyl tetrahydroanthraquinone dissolved in a liter of 2-dimethylamino-4-diethylamino-6-H-triazine at 50° C. were gassed with hydrogen in the presence of palladium until 70 percent of the anthraquinone was hydrogenated. After filtering off the catalyst with exclusion of oxygen, the working solution was oxidized with air and the hydrogen peroxide formed desorbed with n-butyl acetate. There were obtained 200 grams of a 13.5 percent water-free solution of hydrogen peroxide in n-butyl acetate, corresponding to a hydrogen peroxide yield of 27 grams/liter. The density of such a working solution at 50° C. was 1.0575 and the viscosity at the same temperature was 7.13 cps.

EXAMPLE 2

To check the stability of 2-dimethylamino-4-diethylamino-6-H-triazine pure oxygen was lead through 250 ml. of the compound at 130° C. for 60 hours at a velocity of 70 ml/min. The aount of breakdown products after this time was 9.7 percent. The same experiment was repeated with addition of 0.25 percent of 2,6-di-t-butyl phenol and in a further experiment in the presence of 0.25 percent of 2,6-di-t-butyl-4-methylphenol and it was found that under these conditions the 2-dimethyl amino-4-diethylamino-6-H-triazine was completely stable. The amount of breakdown products was 0.05 percent.

EXAMPLE 3

30 grams of a mixture of 2-ethyl anthraquinone and 2-ethyl tetrahydroanthraquinone (50/50) were dissolved in 100 ml. of 2-dimethylamino-4-diethylamino-6-H-triazine, 0.3 gram of 2,6-di-t-butyl-4-methylphenol added and the mixture gassed with hydrogen in the presence of palladium black until about 70 percent of the reaction carrier was hydrogenated. After filtering off the catalyst with exclusion of oxygen the solution was oxidized with air. The speed of oxidation was not influenced by the antioxidant. After desorption with n-butyl acetate as in Example 1 there were obtained 164 grams of a 17.3 percent water-free solution of hydrogen peroxide in n-butyl acetate, corresponding to a hydrogen peroxide yield of 28.4 grams/liter.

EXAMPLE 4

90 grams of 2-ethyl anthraquinone and 90 grams of 2-ethyl tetrahydroanthraquinone were dissolved in 1 liter of a solvent mixture consisting of 70 parts of polyalkyl benzenes (density at 20° C. of 0.89, boiling range 185° to 205° C.) and 30 parts of 2-dimethylamino-4-diethylamino-6-H-triazine and hydrogenated in the presence of suspended palladium. The gassing with hydrogen was stopped when the reaction carriers were 60 percent hydrogenated. After separation of the catalyst the solution was oxidized with oxygen and the hydrogen peroxide extracted with water. Yield: 15 grams of hydrogen peroxide per liter.

What is claimed is:

1. In a process for the production of hydrogen peroxide by the anthraquinone process in which a substituted anthraquinone as the reaction carrier dissoved in a solvent is alternately reduced and oxidized, the improvement comprisng employing as at least 15 percent by volume of the solvent of a stable, liquid triazine having the formula

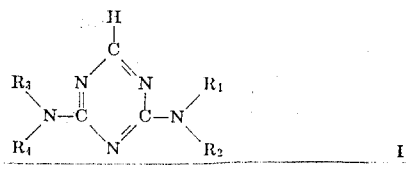

where $R_1$, $R_2$, $R_3$ and $R_4$ are alkyl groups of one to four carbon atoms.

2. The process according to claim 1, wherein the triazine is the sole solvent.

3. The process according to claim 1, including another solvent for said anthraquinone or the hydrogenated anthraquinone.

4. The process according to claim 1, wherein $R_1$ and $R_2$ are alkyl groups of one to two carbon atoms.

5. The process according to claim 4, wherein $R_1$ and $R_2$ are both methyl and $R_3$ and $R_4$ are both ethyl.

6. The process according to claim 1, wherein another quinone or hydroquinone solvent is included having a density of below 0.98 at 20° C., said other solvent being present in an amount sufficient to lower the density of the solution to below 0.98 at 20° C.

7. The process according to claim 6, wherein $R_1$, $R_2$, $R_3$ and $R_4$ are alkyls of one to two carbon atoms.

8. The process according to claim 6, wherein said other solvent is a polyalkyl benzene, t-butyl benzene, a tertiary phosphate ester, a secondary phosphonate ester, a higher alcohol, a ketone or a carboxylic acid ester.

9. The process according to claim 8, wherein the other solvent is a mixture of polyalkylbenzenes, t-butyl benzene, t-butyl toluene, trimethyl benzene, a trialkyl phosphate, a dialkyl phosphonate, diisobutyl carbinol, diisobutyl ketone or methyl cyclohexyl acetate and $R_1$, $R_2$, $R_3$ and $R_4$ are alkyls of one to two carbon atoms.

10. The process according to claim 1, wherein an antioxidant is added to the solution.

11. The process according to claim 10, wherein the antioxidant is a phenolic antioxidant.

12. The process according to claim 11, wherein $R_1$, $R_2$, $R_3$, and $R_4$ are alkyls of one to two carbon atoms and the antioxidant is present in an amount of 0.1 to 1 percent of the solution and is a sterically hindered phenol or naphthol.

13. The process according to claim 12, wherein the antioxidant is 2,6-di-t-butyl phenol or 2,6-di-t-butyl-4-methyl phenol.

14. A composition consisting essentially of an alkyl substituted anthraquinone or alkyl substituted hydrogenated anthraquinone in a solvent comprising at least 15 percent by volume of a liquid triazine of the formula

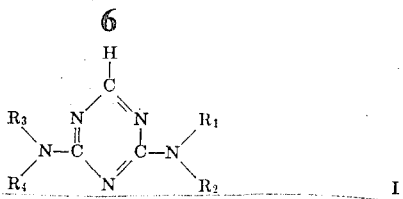

where $R_1$, $R_2$, $R_3$ and $R_4$ are alkyls of one to four carbon atoms.

15. A composition according to claim 14, wherein $R_1$, $R_2$, $R_3$ and $R_4$ are alkyls of one to two carbon atoms.

16. The composition according to claim 14, wherein the triazine is the sole solvent present.

17. The composition according to claim 15, wherein $R_1$ and $R_2$ are both methyl and $R_3$ and $R_4$ are both ethyl.

18. The composition according to claim 15, comprising the presence of an additional solvent for the anthraquinone or anthrahydroquinone, said additional solvent having a density below 0.98 at 20° C. and being present in an amount sufficient to lower the density of the solution to below 0.98 at 20° C.

19. The composition according to claim 18, wherein there is present a phenolic antioxidant in an amount sufficient to stabilize the triazine.

20. In a process for the production of hydrogen peroxide by the anthraquinone process in which a substituted anthraquinone thraquinone as the reaction carrier dissolved in a solvent is alternately reduced and oxidized, the improvement comprising employing as the solvent a stable, liquid triazine having the formula

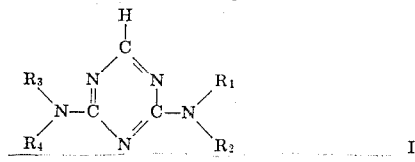

wherein $R_1$, $R_2$, $R_3$ and $R_4$ are alkyl groups of one to four carbon atoms, desorbing the hydrogen peroxide produced with an organic carboxylic acid ester, and recovering said hydrogen peroxide as a water-free solution of hydrogen peroxide in the organic carboxylic acid ester.

21. A composition consisting essentially of an alkyl substituted anthraquinone or alkyl substituted hydrogenated anthraquinone in a solvent comprising at least 15 percent by volume of a liquid triazine of the formula

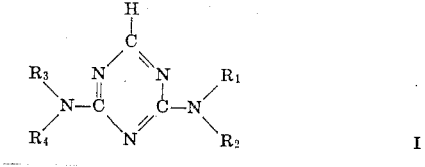

where $R_1$, $R_2$, $R_3$ and $R_4$ are alkyls of one to four carbon atoms, and also containing hydrogen peroxide.

22. The composition according to claim 21 wherein $R_1$, $R_2$, $R_3$ and $R_4$ are alkyls of one to two carbon atoms and the solvent has a density below 0.98 at 20° C.

* * * * *